(12) United States Patent
Harel et al.

(10) Patent No.: US 7,890,389 B2
(45) Date of Patent: Feb. 15, 2011

(54) METHODS AND SYSTEMS FOR GROUPING AND MANAGING STOCK REQUESTS

(75) Inventors: Orit Harel, Kadima (IL); Malkiel Hadari, Hod-Hasharon (IL); Alexander Mandel, Bruchsal (DE); Joachim Epp, Zuzenhausen (DE); Ziv Holzman, Tel-Aviv (IL)

(73) Assignee: SAP AG, Walldorf (DE)

( * ) Notice: Subject to any disclaimer, the term of this patent is extended or adjusted under 35 U.S.C. 154(b) by 1369 days.

(21) Appl. No.: 11/130,104

(22) Filed: May 17, 2005

(65) Prior Publication Data

US 2006/0287939 A1    Dec. 21, 2006

(51) Int. Cl.
*G06Q 10/00* (2006.01)
*G06G 1/14* (2006.01)
(52) U.S. Cl. .......................................... 705/28; 705/22
(58) Field of Classification Search .................. 705/22, 705/28
See application file for complete search history.

(56) References Cited

U.S. PATENT DOCUMENTS

2003/0177050 A1* 9/2003 Crampton et al. .............. 705/8

* cited by examiner

*Primary Examiner*—F. Ryan Zeender
*Assistant Examiner*—Fahd A Obeid
(74) *Attorney, Agent, or Firm*—Finnegan, Henderson, Farabow, Garrett & Dunner LLP

(57) ABSTRACT

Systems, methods, and computer-readable medium are disclosed for releasing stock requests to a storage facility, such as a warehouse. Such systems, methods and computer-readable medium may generate a condition record reflecting a predetermined set of conditions to be met by the attributes of a stock request, receive the stock request including one or more attributes about a stock item, determine whether the attributes of the received stock request meet the conditions of the condition record, associate a wave template of the condition record with the stock request if a determination is made that the stock request does meet the condition record, and create a wave object based on each stock request associated with the wave template. The wave object may then be released to the warehouse for fulfillment of each stock request associated with the wave object.

44 Claims, 14 Drawing Sheets

| Stock Request 2 | | | | 610 | | |
|---|---|---|---|---|---|---|
| Item 618 | Priority Class 620 | Units 622 | Warehouse Picking Area 624 | Delivery Date 626 | Delivery Time 628 | |
| C | High | 50 | PA2 | 20040215 | 19:00 | 612 |
| D | Low | 50 | PA1 | 20040237 | 19:00 | 614 |
| E | Low | 30 | PA1 | 20040227 | 19:00 | 616 |

| Stock Request 1 | | 600 |
|---|---|---|
| Item 608 | Warehouse Picking Area 610 | Units 612 |
| A | PA 2 | 100 |
| B | PA 4 | 25 |
| B | PA 1 | 25 |

602 (row A/PA 2/100)
604 (row B/PA 4/25)
606 (row B/PA 1/25)

FIG. 6a

Stock Request 2 610

| Item 618 | Priority Class 620 | Units 622 | Warehouse Picking Area 624 | Delivery Date 626 | Delivery Time 628 |
|---|---|---|---|---|---|
| C | High | 50 | PA2 | 20040215 | 19:00 |
| D | Low | 50 | PA1 | 20040237 | 19:00 |
| E | Low | 30 | PA1 | 20040227 | 19:00 |

| Wave Attributes ||
|---|---|
| Field | Description |
| WV_TMPLT_ID | Wave Template |
| CUTOFF_TM | Cutoff Time |
| CUTOFF_DAYS | Cutoff Days |
| RLS_TM | Release Time |
| RLS_DAYS | Release Days |
| PICK_COMP_TM | Picking Completion Time |
| PICK_DAYS | Picking Completion Days |
| PACK_COMP_TM | Packing Completion Time |
| PACK_DAYS | Packing Completion Days |
| LOAD_COMP_TM | Wave Completion Time |
| WAVE_CALANDAR | Wave Calandar |
| WAVE_STATUS | Wave Status |
| WAVE_TYPE | Wave Type |
| WAVE_CAT | Wave Category |
| LOAD_CMP_DATE | Loading Completion Date |

FIG. 9

METHODS AND SYSTEMS FOR GROUPING AND MANAGING STOCK REQUESTS

BACKGROUND OF THE INVENTION

I. Field of the Invention

The present invention generally relates to methods and systems for grouping and managing requests to move stock in a warehouse or other storage facilities. More particularly, the invention relates to methods and systems for grouping stock requests based on the attributes of those requests and then managing the release of the grouped requests for processing in the warehouse.

II. Background of the Invention

When a customer places an order to purchase an item, the order goes through various stages before the customer receives the purchased item. For instance, a supplier of the item may determine a shipping route and the means for shipment. The order may then be sent to a warehouse as a stock request so that the item can be collected, packed, and shipped to the customer.

During normal operations, the warehouse may receive many requests for different stock items each day. The items associated with each respective request may be located in different areas of the warehouse, and may require shipment to different destinations, as well as by different shipping priority classes. Typically, the requests to move stock within the warehouse are issued as transfer orders. A transfer order (or "TO") is an instruction to move items from a source location (such as a source storage bin) to a destination location (such as a destination storage bin) within a warehouse complex. A TO may contain information included in the stock request, such as, but not limited to, the item and the quantity of the item to be moved, the source and destination locations, and shipping information. Upon receiving a TO, a warehouse worker will identify from the TO the items to be moved and determine where each is located in the warehouse. The worker may then go to each location to collect the ordered items. Once the items are collected, the worker then packs the items and ships them to the destination specified on the order.

This process can be very time-consuming. A warehouse can only fill a certain number of TOs each day since each worker would potentially be working on an order-by-order basis, and for each TO, on an item-by-item basis. Further, the process can cause high inefficiencies if the worker simply processes each TO serially. For instance, it would be inefficient for the worker to make repeated trips to the same warehouse area to retrieve an item as opposed to retrieving those items in just one trip to that area. This process may also cause congestion within a warehouse if multiple workers collect items from the same areas in the warehouse at the same time.

To manage the processing of TOs in a warehouse, a warehouse worker may manually group certain stock requests based on certain attributes of each request. For instance, the worker may manually group requests based on, for example, a shipping destination or item associated with each request. The manually created group of stock requests (sometimes referred to as a "wave") may then be released to a warehouse worker as a TO for processing.

Such a process, however, can also be time-consuming and lead to errors. The worker, depending on how many requests are received each minute, hour, or day, would have to look at each request to decide how it should be grouped with the other requests based on the various request attributes. The worker can easily overlook one or more stock requests or attributes of the requests, and thus, may have to separately process a request that could have been more efficiently processed when grouped with other requests. The above process also leads to congestion in the warehouse since workers could be instructed to process two different groups of requests for items in the same area of the warehouse. Furthermore, this system becomes very cumbersome as the number of requests to be processed increases, or in cases where the items for each request are located in more than one warehouse.

Existing methods and systems for grouping stock requests also suffer from other drawbacks. For instance, such systems do not give a worker the capability to monitor the processing status of the grouped requests. For instance, if the worker subsequently decides not to process the grouped requests, existing systems do not allow the worker to efficiently cancel that processing instruction or to hold it for processing at a later time. Further, existing systems do not allow the worker to remove and add stock requests to a previously created group of requests or to provide an interface to manage the processing status of the group. In a busy delivery or supply chain environment, this can result in substantial delays and inefficiencies.

In view of the foregoing, there is a need for improved systems and methods for grouping and managing stock requests in a warehouse environment.

SUMMARY OF THE INVENTION

Consistent with embodiments of the present invention, methods and systems are disclosed for releasing stock requests to a warehouse in groups or "waves," including managing the activity of the waves before and after they are sent to the warehouse. In accordance with one embodiment, a computer-implemented method is provided for releasing stock requests to a warehouse. The method may comprise: receiving a stock request including one or more attributes about a stock item; generating a condition record reflecting a predetermined set of conditions to be met by the attributes of a stock request; determining whether the attributes of the received stock request meet the conditions of the condition record; associating a wave template of the condition record with the stock request if a determination is made that the stock request does meet the condition record; creating a wave object based on each stock request associated with the wave template; and releasing the wave object to the warehouse for fulfillment of each stock request associated with the wave object.

In accordance with another embodiment, a computer system for releasing stock requests to a warehouse is provided. The system may comprise: means for receiving a stock request including one or more attributes about a stock item; means for generating a condition record reflecting a predetermined set of conditions to be met by the attributes of a stock request; means for determining whether the attributes of the received stock request meet the conditions of the condition record; means for associating a wave template of the condition record with the stock request if a determination is made that the stock request does meet the condition record; means for creating a wave object based on each stock request associated with the wave template; and means for releasing the wave object to the warehouse for fulfillment of each stock request associated with the wave object.

In yet another embodiment, computer-readable medium containing instructions for performing a method for releasing stock requests to a warehouse is provided. The computer-readable medium may comprise receiving a stock request including one or more attributes about a stock item; generating a condition record reflecting a predetermined set of conditions to be met by the attributes of a stock request; determining whether the attributes of the received stock request meet the conditions of the condition record; associating a wave template of the condition record with the stock request if a determination is made that the stock request does meet the condition record; creating a wave object based on each stock request associated with the wave template; and releasing the wave object to the warehouse for fulfillment of each stock request associated with the wave object.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed. Further, features and/or variations may be provided in addition to those set forth herein. For example, embodiments of the invention may be directed to various combinations and subcombinations of the features described in the detailed description.

BRIEF DESCRIPTION OF THE DRAWINGS

The accompanying drawings, which are incorporated in and constitute a part of this specification, illustrate various embodiments of the invention and together with the description, serve to explain the principles of the invention. In the drawings:

FIGS. 6(a-b) are diagrams of two exemplary stock requests, consistent with an embodiment of the present invention;

FIG. 9 is a diagram of an exemplary wave template, consistent with an embodiment of the present invention.

DETAILED DESCRIPTION

Figure 1:
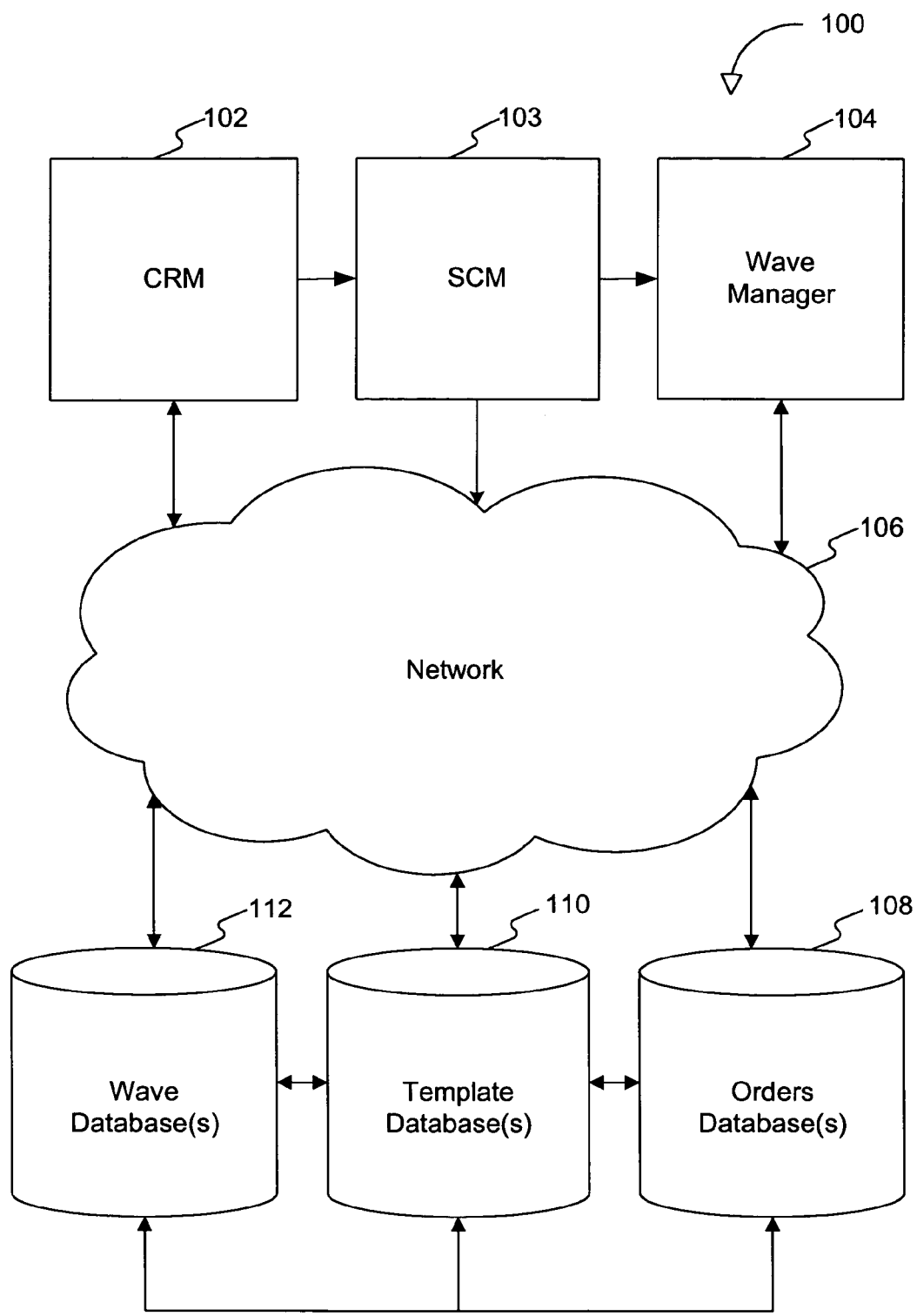
FIG. 1 depicts an exemplary system environment, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions, or modifications may be made to the components illustrated in the drawings, and the exemplary methods described herein may be modified by substituting, reordering or adding stages to the disclosed methods. Accordingly, the following detailed description does not limit the invention. Instead, the proper scope of the invention is defined by the appended claims.

Systems and methods consistent with the invention manage the release of stock requests to a warehouse or other storage facilities for processing in the form of a wave. As used herein, the term "wave" refers to a data object identifying a set of stock requests grouped according to one or more attributes of the stock requests. When a wave is released, transfer orders or TOs may then be created to instruct movements of the corresponding stock items in furtherance of the stock requests. Systems consistent with the invention account for various attributes of a stock request, including, but not limited to, the type of stock items, shipping destinations, shipping priority classes of each stock item, and the locations within a warehouse between which the stock items are to be moved. The system may also consider additional restrictions such as stock items that have already been moved to another location within a warehouse, and restrictions relating to customer information.

As used herein, the term "item" refers to any product or good stored in a warehouse or other facility. By way of example, an item may comprise a part for manufacturing, a finished product, or a part used to provide a service to a customer. An item may also comprise a commercial product, such as a book, an office supply, an article of clothing, an electronic device, a home appliance, or any other type of merchandise. By way of further example, in the context of a warehouse environment for an automotive or machinery supplier, an item may comprise an automotive part, an engine part, or a heavy equipment part and the like.

FIG. 1 depicts an exemplary system environment, consistent with an embodiment of the present invention. System 100 may contain a customer relation management module (CRM) 102, which may be a computer or network of computers for supporting customer communications. In one embodiment, CRM 102 may be implemented as part of a larger customer relationship management system. CRM 102 may receive customer orders and send information related to the customer orders to a Supply Chain Management (SCM) system 103 through network 106. CRM 102 may send the customer orders to the SCM system 103 as "stock requests." SCM system 103 may then send the stock requests to the wave manager 104 through network 106. Network 106 can be any data communications network including a combination of networks, such as the Internet, corporate intranets, a local area network, and other networks compatible with a networking protocol such as TCP/IP. Wave manager 104 may be a computer or network of computers that may receive stock request information from SCM 103 and, in response, schedule the release of a wave to a warehouse.

As shown in FIG. 1, system 100 may also include several databases 108, 110, and 112. Each database or set of databases in system 100 may include information that can be accessed through a database protocol such as, in one embodiment, Structured Query Language (SQL). Orders database 108 may be a database or set of databases which may be accessed by wave manager 104 through network 106. Orders database 108 may store any information related to the stock requests received from SCM 103. This information could be, but is not limited to, the number of items in a request, the shipping destination of each item, the shipping priority class of each item, the location of each item in the warehouse, the scheduled shipping date of an item, and the quantity of each item included in the request.

Template database 110 may be a database or a set of databases, which may also accessed by the wave manager 104. Template database 110 may store wave templates used by system 100 when generating a wave, as described in greater detail below. A wave template may be initially determined by wave manager 104 and may be based on, but is not limited to, the day and time when the wave may be released. Template database 110 may also store condition records, each of which are associated with a wave template, as described in greater detail below.

Wave database 112 may be a database or a set of databases that store information related to the groups of stock requests that are released to the warehouse for TO creation. As noted above, a "wave" refers to a grouping of one or more stock requests. Further, each wave may be associated with stock requests having a common wave template (stored in database 110) assigned by system 100.

Figure 2:
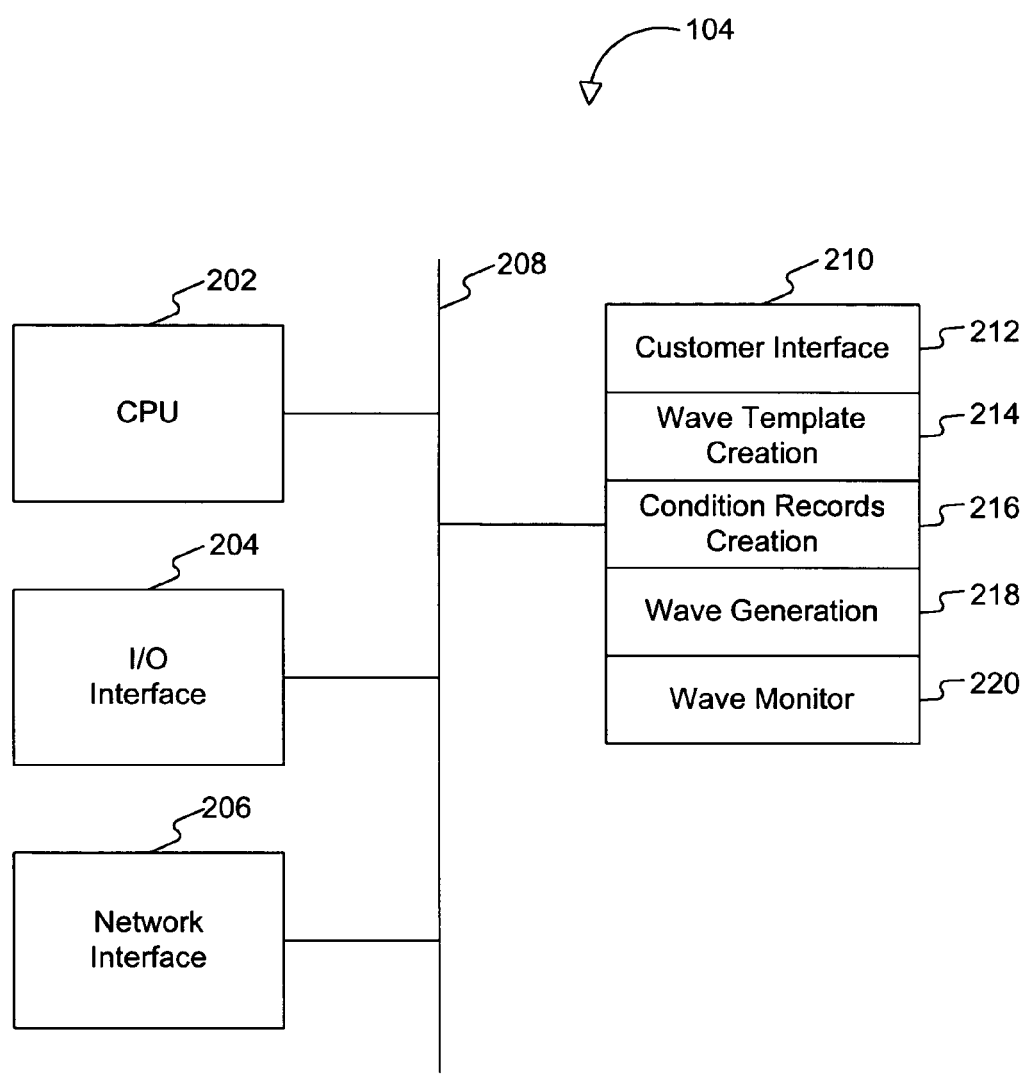
FIG. 2 is a block diagram of an exemplary wave management module, consistent with an embodiment of the present invention.

FIG. 2 is a block diagram of an exemplary wave management module, consistent with an embodiment of the present invention. Wave manager 104 may include at least one central processing unit (CPU) 202, an I/O interface 204, a network interface 206, and memory 210. CPU 202 may execute instructions associated with the processes contained in memory 210 and transmit results to other subsystems of wave manager 104 over a high speed interconnect or data bus 208. I/O interface 204 is an interface that may be used to couple wave manager 104 to devices such as a keyboard, a mouse, a display device, and any other I/O device useful in operating and managing wave manager 104 as is understood by one of skill in the art. The network interface 206 may be used to communicate with network 106 (FIG. 1).

In one embodiment, memory 210 may include: customer interface process 212 that may have program instructions that, when executed, receive the stock request information from SCM 103 (FIG. 1); wave template creation process 214 that may have program instructions that, when executed, create a wave template that includes attributes of when the wave is released to the warehouse for processing; condition records creation process 216 that may have program instructions that, when executed, create one or more condition records to be compared against each stock request received from SCM 103; wave generation process 218 that may have program instructions that, when executed, generate a wave that includes one or more stock requests; and wave monitor process 220 that may have program instructions that, when executed, allow wave manager 104 to release monitor the processing of the waves.

Figure 3:
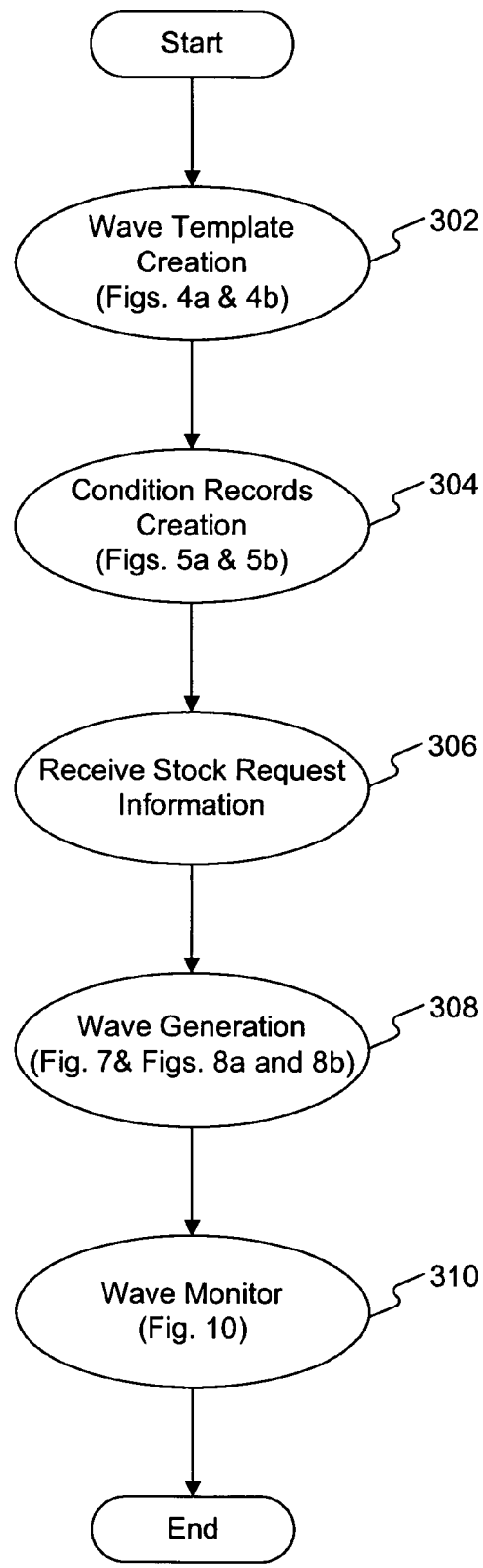
FIG. 3 is a flowchart of an exemplary method for releasing waves to a warehouse, consistent with an embodiment of the present invention.

FIG. 3 is a flowchart of an exemplary method for releasing waves to a warehouse, consistent with an embodiment of the present invention. The flow diagram is described with reference to the embodiment of system 100 depicted in FIG. 1.

Wave manager 104 may first create the wave templates (stage 302). The wave templates correspond to all the possible waves that should be released to the warehouse. Examples of wave template creation is discussed further with regard to FIGS. 4a and 4b. Wave manager 104 may then create the condition records using various attributes of stock requests and associate each condition record with a wave template created in stage 302 (stage 304). Condition record creation is discussed further with regard to FIGS. 5a and 5b.

Wave manager 104 may then receive the stock requests from SCM 103 (stage 306). The stock request may include several types of data. For instance, each request may include, but is not limited to, an identification of the requested stock item, the requested quantity of the stock item, the location of the stock item in the warehouse, the shipping date, the shipping priority class, and the shipping destination. Customer interface process 212 may be executed by CPU 202 for receiving the information corresponding to the stock request.

Wave generation process 218 may generate waves that correspond to groups of the received stock requests (stage 308). As described further below, process 218 may assign one or more wave templates to a stock request based on the information of a respective data type of the stock request. Each data type may correspond to a particular attribute of the stock request. Process 218 may then generate waves based on stock requests having the same assigned wave template. The wave generation process of stage 308 is described in further detail below with respect to FIGS. 7 and 8(*a-b*). After the wave generation process 218 determines the waves, wave monitor process 220 of wave manager 104 may be used to release the wave to the warehouse for processing including the creation of TOs to instruct movement of the particular stock items corresponding to the generated wave and the subsequent execution of those TOs, and to monitor the activities of the wave before and after the wave is released to the warehouse for processing (stage 310). An exemplary embodiment of the wave monitoring process of stage 310 is described in further detail below with respect to FIG. 10.

Figure 4A:
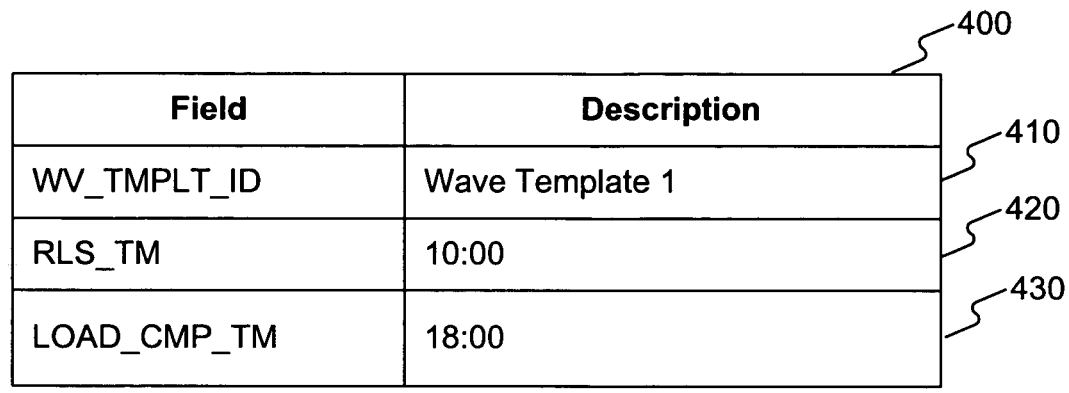
FIGS. 4(a-b) are diagrams of two exemplary wave templates, consistent with an embodiment of the present invention.
Figure 4B:
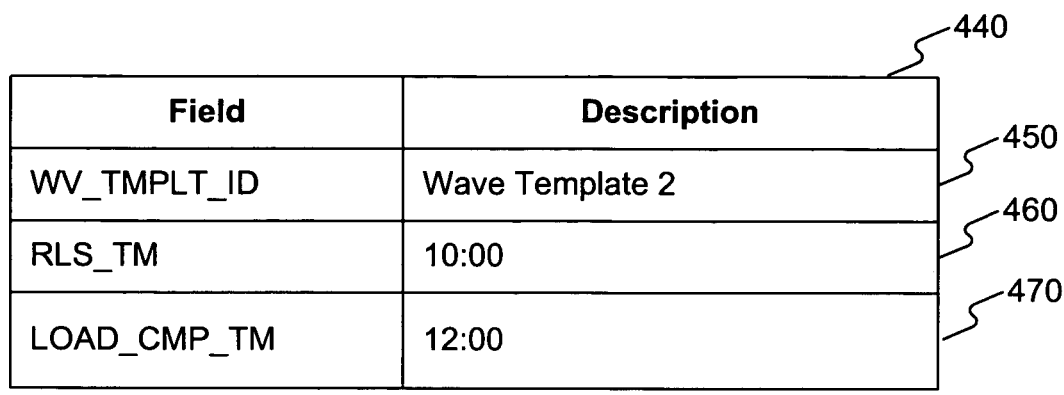

FIGS. 4a and 4b are diagrams of two exemplary wave templates, consistent with an embodiment of the present invention. A wave template is one attribute of a wave. Wave manager 104 may create as many wave templates as needed. Each wave template may be assigned to one or more waves to be released to the warehouse for processing. As shown in FIG. 4a, wave template 400 is defined by three different attributes, the template ID 410, which is "Wave Template 1," the release time 420 that is set for "10:00," and the wave completion time 430 that is "18:00." Therefore, any wave with Wave Template 1 may be released on 10:00 and completed by 18:00. Wave template 400 will be referred to from now on by the template ID "Wave Template 1." FIG. 4b is a second wave template consistent with an embodiment of the present invention. Wave template 440 has a template ID "Wave Template 2," a release time of "10:00," and a wave completion time of "12:00." Wave templates may contain fields other than template ID, release time and release day. For example, a wave template may be defined by any of the following fields: a cutoff time, a cutoff days, a release time, a release days, a picking completion time, a picking completion days, a packing completion time, a packing completion days, a wave completion time, a wave calendar, a wave status, a wave type, and a wave category. Each wave template may be assigned to a wave in the wave generation stage (see stage 308 of FIG. 3).

Figure 5A:
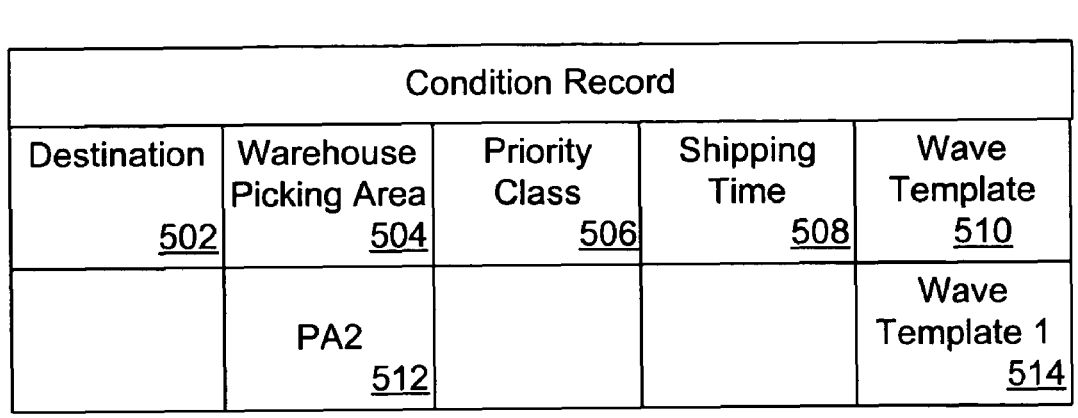
FIGS. 5(a-b) are diagrams of two exemplary condition records, consistent with an embodiment of the present invention.
Figure 5B:
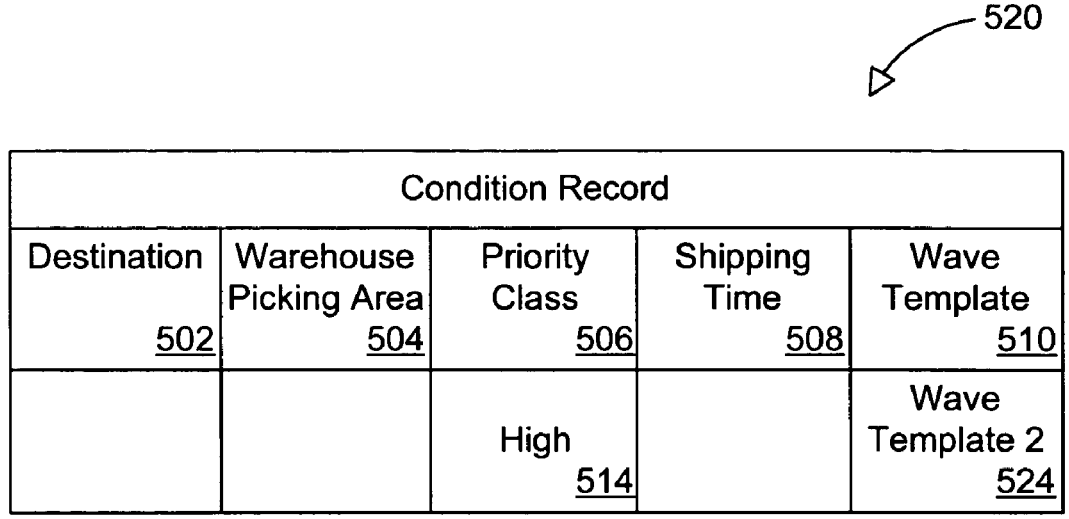

FIGS. 5a and 5b are diagrams of exemplary condition records consistent with an embodiment of the present invention. Wave manager 104 may select from different data types (i.e., attributes) of a stock request in determining a condition record. For example, manager 104 may define conditions for a condition record by selecting one or more data types, such as destination, warehouse picking area, shipping priority class, and shipping time, and define values for those selected data types that would thus correspond to a particular wave template. Manager 104 may specify as many data types as preferred, and can logically combine each selected data type with an "AND" operation. For example, a first attribute in a condition record may be selected as based on the destination data type having a value corresponding to "New York," while a second attribute may be selected as based on a destination data type and a warehouse picking area data type having respective values corresponding to "District of Columbia" and picking area 8 ("PA8").

In the exemplary embodiment of FIG. 5*a*, in determining the first condition record 500, wave manager 104 is able to select the following data types for the condition record: destination 502, warehouse picking area 504, priority class 506, shipping time 508, and wave template 510. In this example, however, wave manager 104 has not defined data types 502, 506, or 508 as conditions, but has defined only warehouse picking area 504 as a condition. More specifically, in this example, wave manager 104 has selected "PA2" or "picking area 2 " 510 as conditions for data type 504. Wave manager 104 has also defined condition record 500 to be associated with Wave Template 1, 514 (see 400 of FIG. 4*a*). Wave manager 104 may have picked any of the existing wave templates to be associated with condition record 500.

FIG. 5*b* also illustrates another condition record 520. In this exemplary condition record, wave manager 104 has selected "HIGH" 514 as the condition for data type priority class 506. Wave manager 104 has defined condition record 520 to be associated with Wave Template 2, 524 (see 420 of FIG. 4*b*). FIGS. 5*a* and 5*b*, thus, illustrate exemplary condition records as defined by wave manager 104 by defining conditions to be met by one or more stock requests.

In another embodiment, wave manager 104 may select more than one condition for the condition record. For example, wave manager 104 may also select a picking area as well as an operation class. In this scenario, all the conditions in the condition record are processed with the "AND" operand.

FIGS. 6*a* and 6*b* are diagrams of two exemplary stock requests, consistent with an embodiment of the present invention. As shown in FIG. 6*a*, the first stock request 600 includes three rows of data 602, 604, 606, with each row including a stock item description 608, a picking area 610 in the warehouse where the stock item is located, and the number of units 612 of the stock item requested by the stock request. As shown in FIG. 6*b*, the second stock request 610 includes three rows of data 612, 614, and 616, with each row including a stock item description 618, the shipping priority class 620 for each stock item, the number of units 622 of the stock item requested by the stock request, the warehouse picking area 624, the delivery date 626 of the stock request, and the delivery date 628 of the stock request. Each row of data represents a part of the stock request order. As described further below, data types 608, 610, 612, 618, 620, 622, 624, 626, and 628 (i.e., the attributes of a stock request) may be used by system 100 to determine a particular wave template to associate with the respective stock request. As will be appreciated by those skilled in the art, embodiments of the present invention are not limited to these particular stock requests, but will be referred to only for illustrating exemplary embodiments consistent with the present invention.

Figure 7:
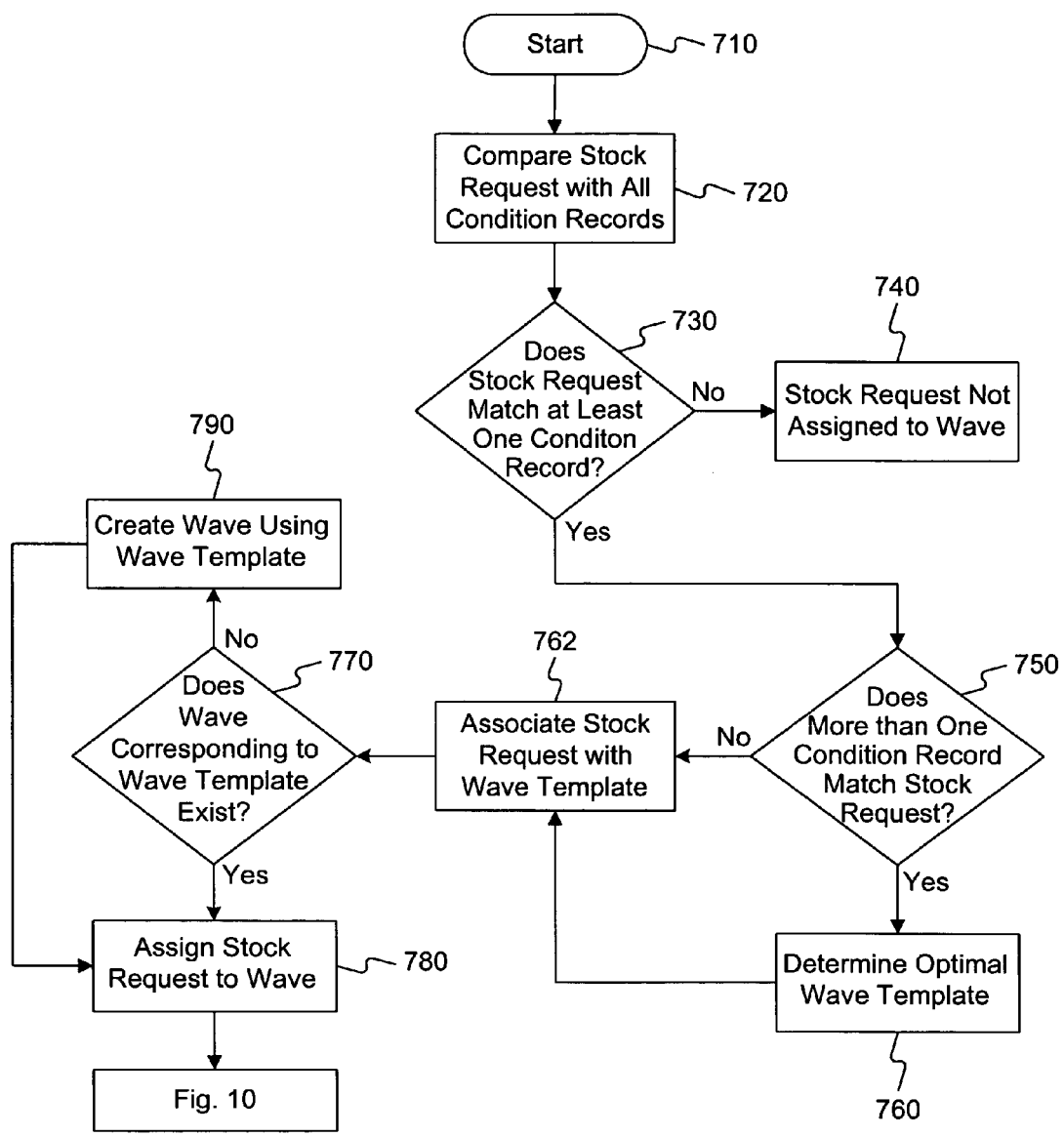
FIG. 7 is an exemplary flowchart of a wave generation process, consistent with an embodiment of the present invention.

FIG. 7 is a flowchart of an exemplary wave generation process consistent with an embodiment of the present invention. The process of FIG. 7 may correspond, for example, to the wave generation process of stage 308 of FIG. 3. Referring to FIG. 7, wave manager 104 may first compare each stock request or portions of each stock request with all of the condition records created in stage 304 (stage 720). Wave manager 104 may analyze each stock request or portions of each stock request to determine whether it meets the conditions of one or more of the condition records. More specifically, wave manager 104 may determine whether the data types of a stock request match with or meet the conditions defined for one or more condition records by comparing the information of each data type with the conditions of each condition record (stage 730). If wave manager 104 determines that the stock request or portions of the stock request does not meet the conditions of any condition records, the stock request is not added to a wave (stage 740). Therefore, this stock request or portion of a stock request will not be sent to the warehouse for processing.

If wave manager 104 determines the stock request or portions of a stock request do meet the condition of one condition record, wave manager 104 may then determine whether a stock request matches or meets the conditions of more than one condition record (stage 750). If wave manager 104 determines the stock request does meet the condition of more than one condition record, wave manager 104 may then determine the most optimal wave template of the condition records to associate with the stock request (stage 760). For example, if the stock request matches two condition records, and each condition record is associated with a first and a second wave template, wave manager 104 may determine which wave template may be the most optimal wave template for the stock request based on delivery date of the stock request. Wave manager 104 may determine that the first wave template may be associated with a release day that is too late to meet the delivery date of the stock request. Therefore, wave manager 104 may associate the second wave template with the stock request. This will be explained further with regard to FIG. 8*b*.

Once wave manager 104 determines the most optimal wave template for the stock request or portions of a stock request, or if the stock request only matches one condition record, manager 104 may assign the wave template corresponding to the condition record to the stock request (stage 762). Wave manager 104 may then determine whether a wave corresponding to the wave template already exists (stage 770). If the wave corresponding to the wave template does not exist, wave manager 104 may create the wave using the wave template and assign the stock request to the new wave (stage 790). As stated above, the wave refers to a data object identifying a set of stock requests grouped according to a commonly assigned wave template. Once the wave template is assigned to a wave, wave manager 104 may determine the time constraints and other attributes for the wave. These time constraints and other wave attributes are further described with respect to FIG. 9.

If the wave corresponding to the wave template already exists, wave manager 104 may assign the stock request corresponding to the wave template to the wave (stage 780). Any stock request or portions of a stock request assigned to the particular wave template will thus be associated with the new wave object. A wave may therefore reflect each stock request or portions of stock requests that have been assigned the same wave template.

In one embodiment, wave manager 104 may determine that a stock request or a portion of a stock request is assigned a particular wave template that was previously assigned to a wave, in other words, the wave template of the stock request or portion of the stock request may not be a new wave template that is being assigned to a new wave; it may have been assigned to a wave when it was created. Since the wave generation process may be a continuous process, wave manager 104 may then determine whether the wave for the particular wave template has already been released to the warehouse for processing. Determination of whether a wave has already been released may depend on the wave status which is discussed further in FIG. 9. If the wave has already been released, the wave status may be "released," and wave manager 104 may not be able to associate the stock request or portion of the stock request with the released wave. Wave manager 104 may therefore create a new wave for the same wave template, and then assign the stock request or portion of the stock request to this new wave.

Figure 8A:
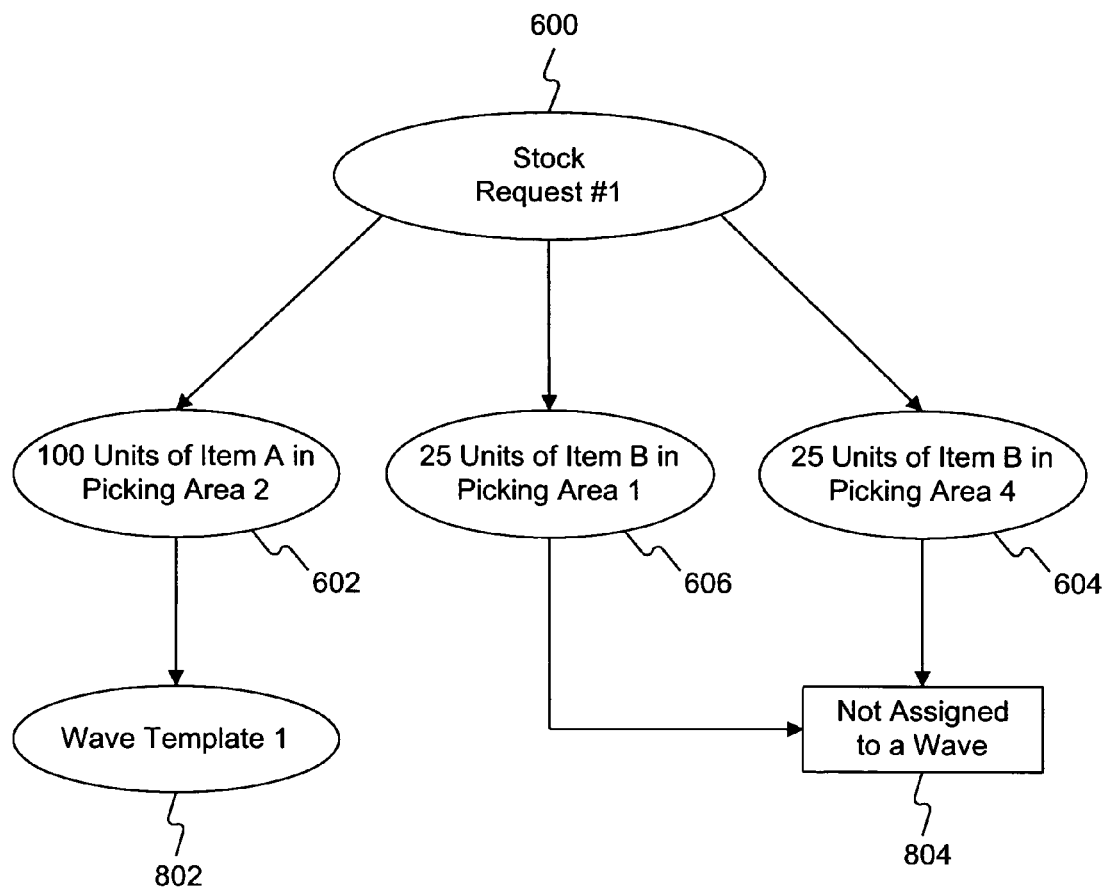
FIGS. 8(a-b) are diagrams of the exemplary stock requests of FIG. 6(a-b) processed by the exemplary condition records of FIG. 5 (a-b), consistent with an embodiment of the present invention.
Figure 8B:
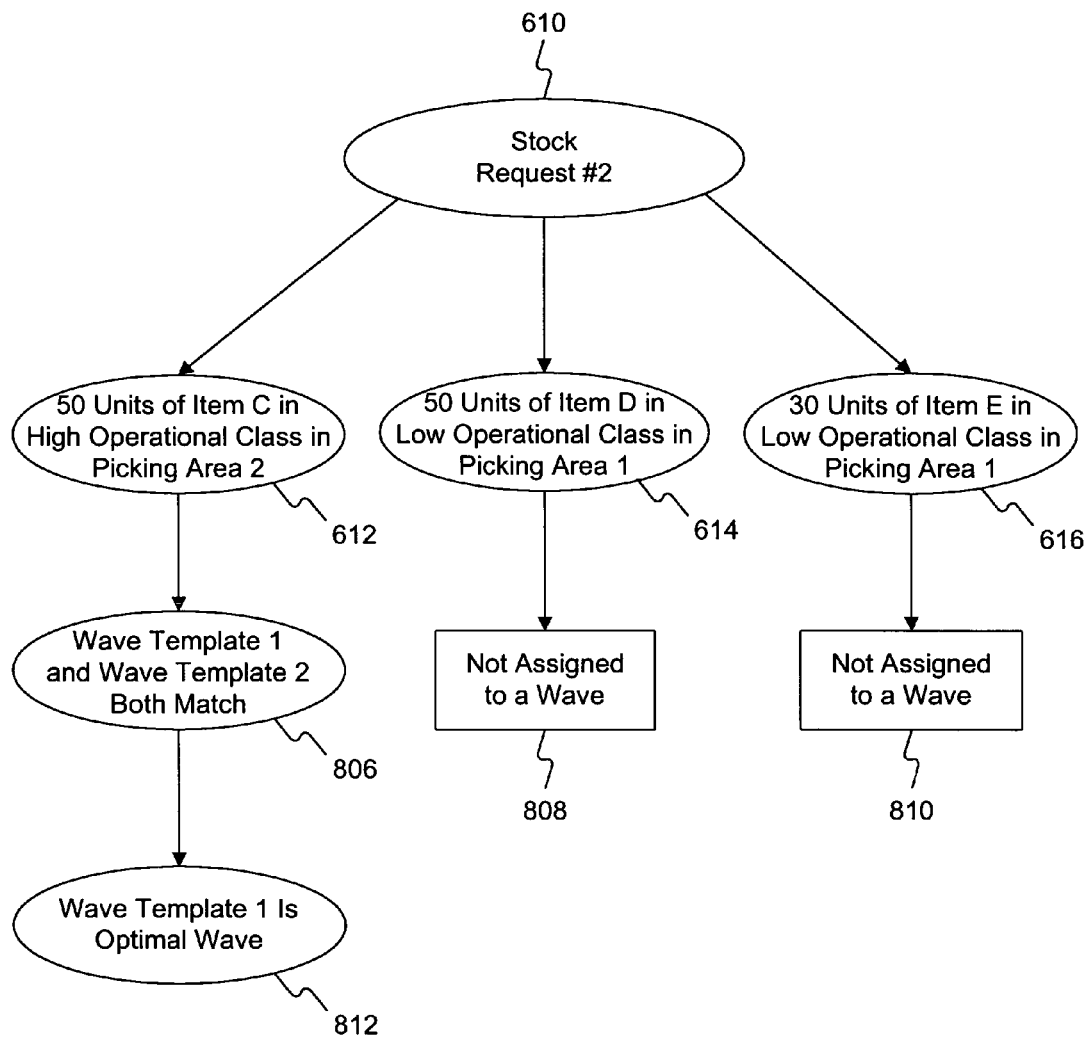

FIGS. 8(a-b) are diagrams of the exemplary stock requests of FIG. 6(a-b) processed by the exemplary condition records of FIGS. 5 (a-b), consistent with an embodiment of the present invention. More specifically, for the example of FIGS. 8a and 8b, wave manager 104 may compare stock requests 600 and 610 to condition records 500 and 520. Further, in this example, wave manager 104 may assign a wave template to each row of stock requests 600 and 610 (e.g., assign a respective wave template to rows 602, 604, 606, 612, 614, and 616, each representing a portion of the stock request).

Referring now to FIG. 8a, wave manager 104 may first compare stock request 600 and 610 to all the condition records, in this scenario, condition records 500 and 520. Condition record 500 requires that that the stock item be located in warehouse picking area "PA2." Accordingly, wave manager 104 may first compare row 602 of stock request 600 to condition record 500. The stock item A of row 602 is located in "PA2." Accordingly, wave manager 104 may assign Wave Template 1 to the row 602 of stock request 500, associated with "100 units of A in picking area 2, unless another condition record matches row 602. If row 602 matches the conditions of another condition record, wave manager 104 would then have to determine the optimal wave template associated with each condition record for the stock request (see 760 of FIG. 7). For row 604 and 606, since the warehouse picking area is picking area 4, row 604 and 606 do not match condition record 500, therefore rows 604 and 606 will not be assigned Wave Template 1.

Wave manager 104 may then compare rows 602, 604, and 606 with condition record 520. The first condition for condition record 520 is that the priority class is "High." Rows 602, 604, and 606 do not have a priority class associated with them, and therefore, wave manager 104 may not assign wave template 2, associated with condition record 520, to rows 602, 604, or 606. Since there are only two condition records created in this example, wave manager 104 may not assign a wave template to rows 604 and 606 (stage 804), and the stock requests 604 and 606 may not be added to a wave (see stage 740 of FIG. 7). Wave manager 104 may then assign Wave Template 1 to row 602 because it was the only condition record that matched (stage 802).

Referring now to FIG. 8b, wave manager may compare rows 610, 612, and 614 to condition record 500. Row 612 has a picking area of "PA2." Therefore, wave manager 104 may assign Wave Template 1, corresponding to condition record 500, to the stock request in row 612. Rows 614 and 616 do not have a picking area of "PA2," and do not therefore meet the conditions of condition record 500. The stock requests associated with these rows will not be assigned Wave Template 1 (see stage 740 of FIG. 7).

Wave manager 104 may then compare stock requests 612, 614, and 616 with condition record 520. The first condition for condition record 520 is that the priority class must be "high." Since row 612 does have a "high" priority class, wave manager 104 may assign wave template 2, corresponding to condition record 520 to row 612. Wave manager 104 may then compare row 614 with condition record 520. Since row 614 has a "low" priority class and therefore does not satisfy the condition of condition record 520, it cannot be assigned Wave Template 2 (stage 808). For similar reasons, wave manager 104 would not assign row 616 to Wave Template 2 (stage 810). Since row 612 meets the conditions for both condition record 500 and 520 (stage 806), wave manager 104 may have to determine the most optimal wave template for the stock request (see 760 of FIG. 7).

Wave manager 104 may use the delivery date of row 612 to determine the most optimal wave template to associate with row 612. Row 612 of stock request 610 has a delivery date of "20040215" and a delivery time of "19:00." Wave Template 1 has a wave completion time "18:00" and Wave Template 2 has a wave completion time "12:00." Both wave templates may have a Wave Calendar allowing the waves to occur Monday-Friday, therefore there may exist a wave each weekday. In order for the stock of row 612 to be delivered by 20040215 by 19:00, wave manager 104 may assign Wave Template 1, or Template 2 to row 612. However, in order to minimize the time where the goods stay on the staging, wave manager 104 may assign Wave Template 1 to row 612. Therefore, Wave Template 1 is the optimal wave template because the release day of Wave Template 1 allows for delivery of the stock associated with row 612 by 20040215, 19:00 (stage 812). If an optimal wave is not found by wave manager 104, the stock request will not be assigned to any wave.

FIG. 9 illustrates an exemplary wave attribute header portion consistent with an embodiment of the present invention. A wave data object may include data defining different attributes of the wave object, as shown in FIG. 9. These wave attributes may be stored in a header portion of the wave data object. In other words, the wave attributes may be stored as part of the file or data segment corresponding to the wave data object. The wave header holding these attributes may include a wave template 914. Wave template 914 is one of the wave templates created by wave manger 104 in stage 302 of FIG. 3. Wave template 914 may be a pointer to the template database 110, which may store the wave template associated with the one or more condition records created by wave manager 104 (see 304 of FIG. 3).

The wave object may also include any of a number of other attributes in the header section, which wave manager 104 may use to monitor the processing status of the wave. These other attributes may, for example, include any of the following attributes:

a cutoff time 918, which may be the time by when stock requests should be added to the wave to be included before the wave is released to the warehouse for processing (e.g., when a transfer order (TO) is issued to instruct a worker to move a particular stock item);

a cutoff days 920, which may be the number of days before a wave is completed that stock requests should be added to the wave in order to be included before the wave is released;

a release time 922, which may be the time at which the wave should be released;

release days 924, which may be the number of days before the wave is completed that it should be released;

a picking completion time 926, which may be the time by when the worker should complete collecting from the warehouse the particular stock items listed in the transfer order a picking completion days 928, which may be the number of days before a wave is completed that the worker should complete collecting from the warehouse the particular stock items listed in the transfer order;

a packing completion time 930, which may be the time by when the worker should complete packing the stock items listed in the transfer order that were previously collected from the warehouse;

a packing completion days 932, which may be the number of days before the wave is completed that the worker should complete packing the stock items listed in the transfer order that were previously collected from the warehouse;

a wave completion time 934, which may be the time that the loading of the previously packed stock items should occur in order to ship the items and thus the wave is completed;

a wave calendar 936, which may be a factory calendar assigned to the wave which defines which days are working days. All calculations based on the number of days (e.g., picking days) are based on this wave calendar;

a wave status 938, which may be a "hold" or "not hold" option that determines whether to hold the release of a wave; and a wave type 940 which may be different types of waves with special characteristics and behaviors.

a wave category 942, which may be different categories of waves with special characteristics and behaviors.

The remainder of the wave data object file may comprise data identifying the one or more stock requests (not pictured) assigned to the wave template. For example, the wave data object may include, for each associated stock request, a pointer to the actual stock request located in orders database 108.

Figure 10:
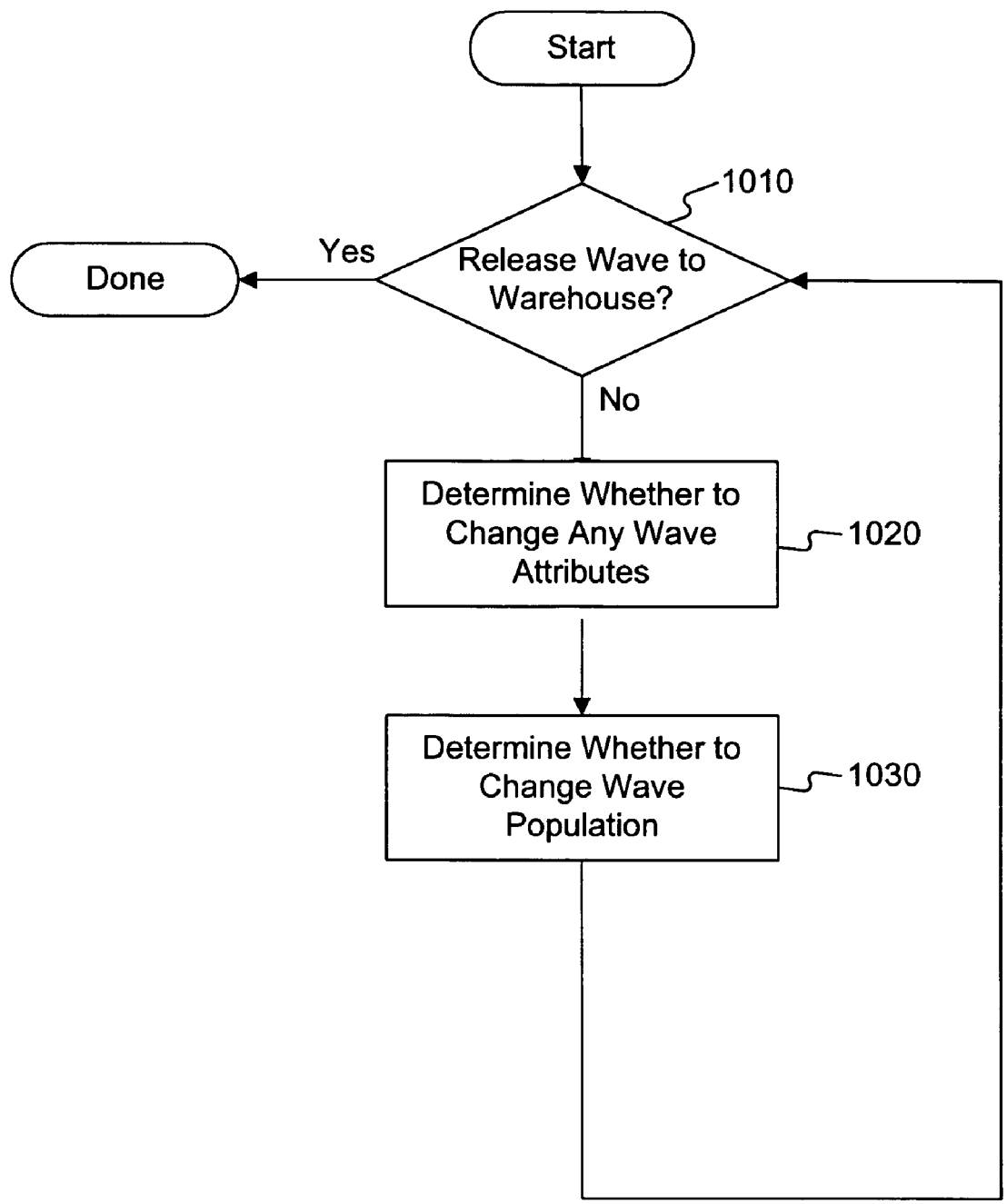
FIG. 10 is a flowchart of an exemplary wave monitoring process, consistent with an embodiment of the present invention.

FIG. 10 is a flowchart of an exemplary wave monitoring process consistent with an embodiment of the present invention. The process of FIG. 10 may correspond, for example, to the wave monitor process of stage 310 of FIG. 3. If wave manager 104 desires to monitor a particular wave, wave manager 104 may access that wave from wave database 112 by performing a search based on any of the wave attributes stored in the wave header file of the wave data object, as discussed with respect to FIG. 9. For example, wave manager 104 may search for a wave based on the wave's release time 922 or based on the wave's picking completion time 926. Wave manager 104 may also search for a wave using a particular stock request ID assigned to a stock request.

Once wave manager 104 has selected a wave, as shown in FIG. 10, wave manager 104 may then determine whether the wave should be released to the warehouse (stage 1010). Wave manager 104 may make this determination by analyzing the release time 922 and release days 924 in the wave object header section. As noted above, releasing of a wave to the warehouse refers to the process of creating TOs that instruct how stock items should be moved in furtherance of the stock requests. The creation of TOs may be done by a warehouse management application compatible with, for example, the Extended Warehouse Management (EWM) software which is part of the mySAP SCM Solution provided by SAP Aktiengesellschaft, Walldorf, Germany.

If the wave has not been released, wave manager 104 may change one or more wave attributes (stage 1020). Changing a wave attribute may include, but is not limited to, changing the cutoff time 918, cutoff days 920, release time 922, release days 924, picking completion time 926, picking completion days 928, packing completion time 930, packing completion days 932, loading completion time 934, wave calendar 926, wave status 938, wave type 940, and wave category 942, which may all be located in the wave header section (see FIG. 9).

Wave manager 104 may, for example, change the release time 922 to a different time than originally set. For example, a wave may have a release time of "Monday 9:00 am." Wave manager 104 may override this release time attribute (922) and change the release time to a different time, which may be "Monday 8:00 am," such that the wave should be released on "Monday at 8:00 am" instead of "9:00 am." Another way wave manager 104 may also hold the wave for possible releasing at a later time. Wave manager 104 may "hold" a wave by changing the wave status 938 in the wave header section to "yes." If wave manager 104 "holds" a wave, the wave would not be released to the warehouse even if the wave release time 922 indicates that the wave should be released. In exemplary embodiments, a wave that is on "hold" can only be released by wave manager 104. Wave manager 104 may release the wave by changing the wave status 940 to "no." A wave may only be held if the wave has not been released. A wave is released if the wave status 940 indicates "released."

Wave manager 104 may also delete a wave. When a wave is deleted, it is deleted from the wave database 112, such that the wave is never released to the warehouse for processing. Once a wave is deleted, all stock requests or portions of a stock requests that were previously assigned to the deleted wave then become unassigned. In one embodiment, wave manager 104 may then reassign stock requests to another wave. Reassigning stock requests may comprise of changing the wave template of each stock request to another wave template or adding the stock requests to an existing wave with the same wave template as the wave that the stock requests were unassigned.

Wave manager 104 may also change the wave population of a wave that wave manager 104 may have created earlier (stage 1030). Changing a wave population may include, but is not limited to, removing a stock request from a wave, adding a stock request to a wave, unassigning a stock request from an existing wave, and/or reassigning a stock request to another wave. Wave manager 104 may remove a stock request from a wave by deleting the stock request ID from the body of the wave object file. Wave manager 104 may add a stock request to a wave by adding the stock request ID associated with a particular stock request to the wave object file. Unassignment of a stock request may be possible before and after the wave release time 922 has passed.

Wave manager 104 may also add a stock request to a wave by merging one or more waves into one wave. In merging one or more waves, wave manager 104 may remove the stock requests by deleting the stock request IDs from the wave object file of the first wave and adding these stock request IDs to the wave object file of the second wave. Similarly, wave manager 104 may split a wave into two or more separate waves. Wave manager 104 may split a wave by creating a new wave with the same header section as the first wave, and move select stock request IDs from the first wave to the new wave.

Once wave manager 104 determines that a wave object should be released for TO creation, the one or more stock requests of the wave may first be sent to a picking location determination module, before the TOs are created by the warehouse management application. This picking location determination module determines the location of each of the stock items described in the stock requests within the warehouse. After the pick locations are determined for each stock item, wave manager 104 may allocate the stock in the inventory to each stock request so that the stock in the warehouse will be available when the TO is released for processing. Once the stock in the inventory is allocated for each stock request, the warehouse management application may then create one or more TOs.

A TO may be created for each stock request or each portion of a stock request in each wave. Once the warehouse management application creates the TOs, the TOs may then be released to the warehouse for processing. During TO processing, each TO is carried out by the warehouse workers, where the stock items described in each stock request are moved from the source location (such as a source storage bin) to the destination location (such as a destination storage bin) within the warehouse complex.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in may other ways, using equivalents and alternatives that do not depart from the scope of the following claims.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A computer-implemented method of releasing stock requests to a warehouse, the method comprising:
    generating, using a processor and a memory, (i) a first condition record reflecting a first predetermined set of conditions to be met by attributes of a stock request and (ii) a second condition record reflecting a second predetermined set of conditions to be met by attributes of the stock request, the first condition record being associated with a first particular wave template and the second condition record being associated with a second particular wave template;
    receiving, using the processor and the memory, at least one stock request including one or more attributes about a stock item;
    determining, using the processor and the memory, whether the attributes of each said received stock request meet the conditions of said first condition record;
    determining, using the processor and the memory, whether the attributes of each said received stock request meet the conditions of said second condition record;
    assigning, using the processor and the memory, a selected wave template, comprising:
        assigning, using the processor and the memory, the first particular wave template to each stock request if a determination is made that the stock request does meet the first condition record and does not meet the second condition record;
        assigning, using the processor and the memory, the second particular wave template to each stock request if a determination is made that the stock request does meet the second condition record and does not meet the first condition record;
        determining, using the processor and the memory, an optimal wave template to assign to each stock request if a determination is made that the stock request does meet the first condition record and the second condition record, the optimal wave template being either the first particular wave template or the second particular wave template; and
        assigning, using the processor and the memory, the optimal wave template to each stock request if the optimal wave template is determined;
    creating, using the processor and the memory, a wave object based on each said stock request associated with the selected wave template;
    adding, using the processor and the memory, the at least one stock request to the wave object;
    determining, using the processor and the memory, whether the wave object should be released;
    determining, using the processor and the memory, whether a wave status reflects that the wave object is released;
    monitoring, using the processor and the memory, activity of the wave object based on determination of whether the wave object is released; and
    releasing, using the processor and the memory, the wave object to the warehouse for fulfillment of each said stock request associated with the wave object,
    wherein the selected wave template is not assigned if a determination is made that the stock request does not meet the first condition record and the second condition record.

2. The method of claim 1, further comprising:
    receiving, using the processor and the memory, a plurality of stock requests, each including one or more attributes about a respective stock item.

3. The method of claim 2, wherein the wave object reflects each stock request which is assigned a common wave template.

4. The method of claim 1, wherein generating at least one condition record further comprises:
    using selection criteria to define sets of conditions relating to the attributes of each stock request; and
    setting each set of conditions as the first or second condition record.

5. The method of claim 4, wherein the selection criteria includes at least one of a route, a picking area, an operation class, and a number of units.

6. The method of claim 1, wherein the wave object consists of timing constraints and wave attributes.

7. The method of claim 1, wherein the attributes of each stock request include at least one of a route, a picking area, an operation class, a delivery date, and a number of units.

8. The method of claim 1, wherein the attributes of the wave object includes at least one of a wave template, a cutoff time, a cutoff days, a release time, a release days, a picking completion time, a picking completion days, a packing completion time, a packing completion days, a wave completion time, a wave calendar, a wave status, a wave type, or a wave category, and wherein the wave object includes one or more stock request IDs, each of the stock request IDs corresponding to one stock request.

9. The method of claim 1, wherein the monitoring step further comprises: changing at least one of the release time or the wave status.

10. The method of claim 1, wherein the monitoring step further comprises: adding a new stock request ID to the wave object; and removing an existing stock request ID from the wave object.

11. The method of claim 1, wherein the monitoring step further comprises: adding a new stock request ID to the wave object; and removing the existing stock request ID from the wave object and adding the existing stock request ID to a second wave object.

12. The method of claim 1, wherein the monitoring step further comprises: deleting the wave object by setting the wave status; removing the stock request IDs of the deleted wave object; and adding the stock requests IDs of the deleted wave object to a new wave object.

13. The method of claim 1, wherein the monitoring step further comprises: deleting the wave object by setting the wave status; removing the stock request IDs of the deleted wave object; and adding the stock requests IDs of the deleted wave object to an existing wave object.

14. The method of claim 8, further comprising:
determining, using the processor and the memory, whether the wave object is released; and
changing, using the processor and the memory, at least one of the cutoff time, the cutoff days, the release time, the release days, the picking completion time, the picking completion days, the packing completion time, the packing completion days, the loading completion time, the weekdays profile, the wave calendar, wave status, wave type, or wave category based on the determination of whether the wave object is released.

15. A computer system for releasing stock requests to a warehouse, the system comprising:
means for generating (i) a first condition record reflecting a first predetermined set of conditions to be met by attributes of a stock request and (ii) a second condition record reflecting a second predetermined set of conditions to be met by attributes of the stock request, the first condition record being associated with a first particular wave template and the second condition record being associated with a second particular wave template;
means for receiving at least one stock request including one or more attributes about a stock item;
means for determining whether the attributes of each said received stock request meet the conditions of said first condition record;
means for determining whether the attributes of each said received stock request meet the conditions of said second condition record;
means for assigning a selected wave template, comprising:
means for assigning the first particular wave template to each stock request if a determination is made that the stock request does meet the first condition record and does not meet the second condition record;
means for assigning the second particular wave template to each stock request if a determination is made that the stock request does meet the second condition record and does not meet the first condition record;
means for determining an optimal wave template to assign to each stock request if a determination is made that the stock request does meet the first condition record and the second condition record, the optimal wave template being either the first particular wave template or the second particular wave template; and
means for assigning the optimal wave template to each stock request if the optimal wave template is determined;
means for creating a wave object based on each said stock request associated with the selected wave template;
means for adding the at least one stock request to the wave object;
means for determining whether the wave object should be released;
means for determining whether a wave status reflects that the wave object is released;
means for monitoring activity of the wave object based on determination of whether the wave object is released; and
means for releasing the wave object to the warehouse for fulfillment of each said stock request associated with the wave object,
wherein the selected wave template is not assigned if a determination is made that the stock request does not meet the first condition record and the second condition record.

16. The system of claim 15, further comprising:
means for receiving a plurality of stock requests, each including one or more attributes about a respective stock item.

17. The system of claim 15, wherein the wave object reflects each stock request which is assigned a common wave template.

18. The system of claim 15, wherein the means for generating at least one condition record further comprises:
means for using selection criteria to define sets of conditions relating to the attributes of each stock request; and
means for setting each set of conditions as the first or second condition record.

19. The system of claim 18, wherein the selection criteria includes at least one of a route, a picking area, an operation class, and a number of units.

20. The system of claim 15, wherein the wave object consists of timing constraints and wave attribute.

21. The system of claim 15, wherein the attributes of each stock request include at least one of a route, a picking area, an operation class, a delivery date, and a number of units.

22. The system of claim 15, wherein the attributes of the wave object includes at least one of a wave template, a cutoff time, a cutoff days, a release time, a release days, a picking completion time, a picking completion days, a packing completion time, a packing completion days, a wave completion time, a wave calendar, a wave status, a wave type, or a wave category, and wherein the wave object includes one or more stock request IDs, each of the stock request IDs corresponding to one stock request.

23. The system of claim 15, wherein the means for monitoring further comprises: means for changing at least one of the release time or the wave status.

24. The system of claim 15, wherein the means for monitoring further comprises: means for adding a new stock request ID to the wave object; and means for removing an existing stock request ID from the wave object.

25. The system of claim 15, wherein the means for monitoring further comprises: means for adding a new stock request ID to the wave object; and means for removing the existing stock request ID from the wave object and adding the existing stock request ID to a second wave object.

26. The system of claim 15, wherein the monitoring further comprises: means for deleting the wave object by setting the wave status; means for removing the stock request IDs of the deleted wave object; and means for adding the stock requests IDs of the deleted wave object to a new wave object.

27. The system of claim 15, wherein the monitoring further comprises: means for deleting the wave object by setting the wave status; means for removing the stock request IDs of the deleted wave object; and means for adding the stock requests IDs of the deleted wave object to an existing wave object.

28. The system of claim 22, further comprising:
means for determining whether the wave object is released; and
means for changing at least one of the cutoff time, the cutoff days, the release time, the release days, the picking completion time, the picking completion days, the packing completion time, the packing completion days, the loading completion time, the weekdays profile, the wave calendar, wave status, wave type, or wave category based on the determination of whether the wave object is released.

29. A computer-readable medium containing instructions for performing a method for releasing stock requests to a warehouse, the instructions stored in the computer-readable medium being executed in a processor to perform the method, the method comprising:
generating (i) a first condition record reflecting a first predetermined set of conditions to be met by attributes of a stock request and (ii) a second condition record reflecting a second predetermined set of conditions to be met by attributes of the stock request, the first condition record being associated with a first particular wave template and the second condition record being associated with a second particular wave template;
receiving at least one stock request including one or more attributes about a stock item;
determining whether the attributes of each said received stock request meet the conditions of said first condition record;
determining whether the attributes of each said received stock request meet the conditions of said second condition record;
assigning a selected wave template comprising:
assigning the first particular wave template to each stock request if a determination is made that the stock request does meet the first condition record and does not meet the second condition record;
assigning the second particular wave template to each stock request if a determination is made that the stock request does meet the second condition record and does not meet the first condition record;
determining an optimal wave template to assign to each stock request if a determination is made that the stock request does meet the first condition record and the second condition record, the optimal wave template being either the first particular wave template or the second particular wave template; and
assigning the optimal wave template to each stock request if the optimal wave template is determined;
creating a wave object based on each said stock request associated with the selected wave template;
adding the at least one stock request to the wave object;
determining whether the wave object should be released;
determining whether a wave status reflects that the wave object is released;
monitoring activity of the wave object based on determination of whether the wave object is released; and
releasing the wave object to the warehouse for fulfillment of each said stock request associated with the wave object,
wherein the selected wave template is not assigned if a determination is made that the stock request does not meet the first condition record and the second condition record.

30. The computer-readable medium of claim 29, further comprising:
receiving a plurality of stock requests, each including one or more attributes about a respective stock item.

31. The computer-readable medium of claim 30, wherein the wave object reflects each stock request which is assigned a common wave template.

32. The computer-readable medium of claim 29, wherein generating at least one condition record further comprises:
using selection criteria to define sets of conditions relating to the attributes of each stock request; and
setting each set of conditions as the first or second condition record.

33. The computer-readable medium of claim 32, wherein the selection criteria includes at least one of a route, a picking area, an operation class, and a number of units.

34. The computer-readable medium of claim 29, wherein the wave object consists of timing constraints and wave attributes.

35. The computer-readable medium of claim 29, wherein the attributes of each stock request include at least one of a route, a picking area, an operation class, a delivery date, and a number of units.

36. The computer-readable medium of claim 29, wherein the attributes of the wave object include at least one of a wave template, a cutoff time, a cutoff days, a release time, a release days, a picking completion time, a picking completion days, a packing completion time, a packing completion days, a wave completion time, a wave calendar, a wave status, a wave type, or a wave category, and wherein the wave object includes one or more stock request IDs, each of the stock request IDs corresponding to one stock request.

37. The computer-readable medium of claim 29, wherein the monitoring step further comprises: changing at least one of the release time or the wave status.

38. The computer-readable medium of claim 29, wherein the monitoring step further comprises: adding a new stock request ID to the wave object; and removing an existing stock request ID from the wave object.

39. The computer-readable medium of claim 29, wherein the monitoring step further comprises: adding a new stock request ID to the wave object; and removing the existing stock request ID from the wave object and adding the existing stock request ID to a second wave object.

40. The computer-readable medium of claim 29, wherein the monitoring step further comprises: deleting the wave object by setting the wave status; removing the stock request IDs of the deleted wave object; and adding the stock requests IDs of the deleted wave object to a new wave object.

41. The computer-readable medium of claim 29, wherein the monitoring step further comprises: deleting the wave object by setting the wave status; removing the stock request IDs of the deleted wave object; and adding the stock requests IDs of the deleted wave object to an existing wave object.

42. The computer-readable medium of claim 36, wherein the monitoring step further comprises:
   determining whether the wave object is released; and
   changing at least one of the cutoff time, the cutoff days, the release time, the release days, the picking completion time, the picking completion days, the packing completion time, the packing completion days, the loading completion time, the weekdays profile, the wave calendar, wave status, wave type, or wave category based on the determination of whether the wave object is released.

43. The computer-implemented method of claim 1, further comprising:
   determining, using the processor and the memory, whether the wave object has been released before releasing the wave object to the warehouse.

44. The computer-implemented method of claim 1, wherein if the selected wave template is not assigned, the stock request is not released to the warehouse.

* * * * *